United States Patent [19]

Lindner et al.

[11] Patent Number: 4,755,564
[45] Date of Patent: Jul. 5, 1988

[54] GRAFT POLYMERS

[75] Inventors: Christian Lindner, Cologne; Ludwig Trabert, Krefeld; Herbert Bartl, Odenthal; Karl-Heinz Ott, Leverkusen, all of Fed. Rep. of Germany

[73] Assignee: Bayer Aktiengesellschaft, Leverkusen-Bayerwerk, Fed. Rep. of Germany

[21] Appl. No.: 798,893

[22] Filed: Nov. 18, 1985

[30] Foreign Application Priority Data

Nov. 28, 1984 [DE] Fed. Rep. of Germany ....... 3443343

[51] Int. Cl.$^4$ ............................................. C08F 27/00
[52] U.S. Cl. ..................................... 525/293; 525/66; 525/296
[58] Field of Search ................... 525/296, 293, 66

[56] References Cited

U.S. PATENT DOCUMENTS 4,178,329 12/1979 Becker et al. ................... 525/77
4,221,879 9/1980 Humme et al. .................. 525/66
4,519,929 5/1985 O'Brien et al. .................. 525/296

FOREIGN PATENT DOCUMENTS 3505524 10/1985 Fed. Rep. of Germany .

OTHER PUBLICATIONS

Chemical Abstracts 105:153768t, 93:26856d and 91:58078b, 91:44538q.
Chemical Abstracts, Book 99, No. 8, Aug. 22, 1983, p. 309, Zusammenfassung Nr. 58849u, Columbus, Ohio, U.S.; S. Roesinger et al.

*Primary Examiner*—Lewis T. Jacobs
*Assistant Examiner*—A. Carrillo
*Attorney, Agent, or Firm*—Connolly & Hutz

[57] ABSTRACT

This invention relates to graft polymers produced from:
(1) an elastomer component having glass transition temperatures below 0° C. as the graft base; and
(2) graft monomers corresponding to the following general formula:

$$CH_2=\underset{\underset{R^1}{|}}{C}-X-\underset{\underset{R^3}{|}}{N}-\underset{\underset{O}{\|}}{C}-R^2 \qquad (I)$$

wherein
$R^1$ represents H or a $C_1$-$C_4$ alkyl radical;
$R^3$ represents H, phenyl or a $C_1$-$C_8$ alkyl radical;
$R^2$ represents H, a $C_1$-$C_{10}$ alkyl or $C_6$-$C_{12}$ aryl radical or —$OR^4$; and
$R^4$ represents $C_1$-$C_8$ alkyl or $C_6$-$C_{12}$ aryl optionally substituted by alkyl groups, O-containing or N-containing groups;
X represents a single bond, a $C_1$-$C_{10}$ alkylene or $C_6$-$C_{12}$ arylene radical, $$-\underset{\underset{O}{\|}}{C}-Y;$$

Y represents —O—Z—, —NH—Z—; and
Z represents a $C_1$-$C_{10}$ alkylene or $C_6$-$C_{12}$ arylene radical;
and, optionally, other olefinically unsaturated monomers.

19 Claims, No Drawings

GRAFT POLYMERS

This invention relates to new graft polymers based on elastomers as the graft base and grafted-on vinyl monomers, to the production thereof and to mixtures thereof with certain thermoplastic resins.

More particularly, these new graft copolymers are produced from:

(1) an elastomer component having glass transition temperatures below 0° C., more particularly below −20° C. as the graft substrate; and
(2) graft monomers corresponding to the following general formula:

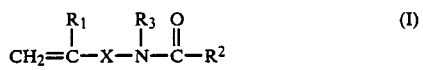

wherein $R_1$ represents H or a $C_1$–$C_4$ alkyl radical, preferably H or —$CH_3$;

$R_3$ represents H, a phenyl or $C_1$–$C_8$ alkyl radical;

$R_2$ represents H, a $C_1$–$C_{10}$ alkyl or $C_6$–$C_{22}$ aryl radical or —$OR^4$, more particularly —$OR^4$;

$R_4$ represents a $C_1$–$C_8$ alkyl or $C_6$–$C_{12}$ aryl radical optionally substituted by alkyl groups or by O- or N-containing groups;

X represents a single bond, a $C_1$–$C_{10}$ alkylene or $C_6$–$C_{12}$ arylene radical or a group of the formula

Y represents —O—Z—, —NH—Z—; and

Z represents a $C_1$–$C_{10}$ alkylene or $C_6$–$C_{12}$ arylene radical.

Particularly suitable graft monomers corresponding to general formula (I) are N-vinylacetamide, N-vinyl-N-methyl acetamide, N-vinylmethylurethane, N-vinylphenylurethane,

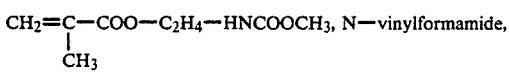

N—vinylformamide,

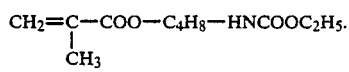

Particularly preferred compounds (I) are those which contain a urethane group in the molecule and which correspond to the following general formula:

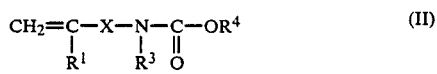

wherein $R^1$, $R^3$ and $R^4$ are as defined above, N-vinylurethanes or monomers corresponding to the following general formula:

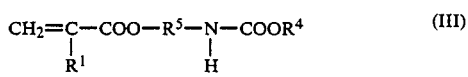

wherein
$R^1$ and $R^4$ are as defined above; and $R^5$ represents a $C_1$–$C_{10}$ alkylene radical.

Preferred graft polymers are produced from 8 to 85% by weight, and preferably from 50 to 75%, by weight of a graft substrate; and from 92 to 15%, by weight, preferably from 50 to 25%, by weight, of monomers to be grafted on which consist of from 0.1 to 100%, by weight, preferably from 0.5 to 20%, by weight of monomers corresponding to general formula (I) and from 0 to 99.9%, by weight preferably from 99.5 to 80%, by weight, of other $\alpha,\beta$-unsaturated monomers.

The olefinically monounsaturated monomers optionally useable in admixture with at least one monomer (I) for graft copolymerization are those which are radically polymerizable and which are capable of copolymerization with the monomers of general formula (I). Vinyl or vinylidene monomers are preferred, particularly preference being attributed to monomers selected from styrenes, such as styrene, $\alpha$-methylstyrene, p-methylstyrene esters, halogen styrenes, $\alpha,\beta$-unsaturated nitriles, such as acrylonitrile or methacrylonitrile, acrylates, such as alkyl acrylates containing up to 12 carbon atoms in the ester group and also the corresponding methacrylates, methacrylic acid, acrylic acid, acrylamide, methacrylamide, vinylacetate, vinylpropionate, $\alpha$-olefins, such as ethylene, propylene, butadiene, chloroprene, vinylchloride, and also maleic acid derivatives, such as maleic acid anhydride.

The elastomer components present in the graft copolymers according to the present invention are elastomers having glass transition temperatures below 0° C. and, more particularly, below −20° C., such as elastomers selected from diene rubbers (especially polybutadiene, polychloroprene, polyisoprene), olefin rubbers (such as ethylene polymers, ethylenevinylacetate copolymers, ethylene-acrylate copolymers, EPDM-rubbers), silicone rubbers or acrylate rubbers, preferably homo- or co-polymers of alkyl acrylates containing up to 12 carbon atoms in the ester group which, for possible cross-linking, may be copolymerized with polyfunctional unsaturated monomers. Preferred rubber components are polybutadienes and copolymers thereof with styrene or acrylonitrile and also acrylate rubbers. The elastomers may be uncross-linked or partially cross-linked or highly cross-linked. Elastomers partially cross-linked to a least 50% are particularly preferred.

Elastomers having an average particle size of from 0.05 to 8 μm ($d_{50}$-value determined by ultra centrifuge), preferably from 0.08 to 1 μm, are particularly preferred.

Particularly suitable rubbers are polybutadienes or copolymers thereof having particle sizes of from 0.09 to 0.6 μm and gel contents of greater than 50%, by weight, and also alkyl acrylate rubbers having particle sizes of from 0.09 to 0.6 μm and gel contents of greater than 20%, by weight, more particularly greater than 80%, by weight. Alkyl acrylate rubbers are particularly advantageous when they have a so-called core-shell structure, i.e. they contain a core of polymer which is not an acrylate rubber. This core is surrounded by a shell of cross-linked alkyl acrylate rubber onto which the monomers (I) are grafted, optionally in combination with other monomers.

Preferred graft copolymers according to the present invention are particulated having a particle size ($d_{50}$) of from 0.05 to 8 μm, are at least partially cross-linked and are derived from diene or alkyl acrylate rubbers.

The graft polymers according to the present invention are produced by radically graft copolymerizing at least one monomer (I), optionally in combination with other ethylenically unsaturated monomers, in the presence of an elastomer.

In this process, uncross-linked or at least partially cross-linked rubbers may be used for graft copolymerization. Where uncross-linked rubbers are used, the graft copolymerization process may be carried out in such a way that the rubbers are also cross-linked to the requisite degree during grafting. Grafting may be carried out at temperatures of from 20° to 170° C., preferably from 50° to 100° C. The process may be carried out by mass, solution, dispersion or suspension polymerization. Dispersions, precipitation and suspension polymerization are preferred, emulsion polymerization being particularly preferred. The polymerization process may be carried out in organic media or in aqueous media. If the grafted copolymers according to the present invention are produced by the preferred process of emulsions polymerization, it is advantageous to start with an emulsion of a rubber of which the emulsion particle size lies within the range according to the present invention, although, on the other hand, the rubber particles may also be enlarged to a desired particle size by known agglomeration processes carried out before or after the graft copolymerization reaction.

Grafting is carried out radically, i.e. using radical-forming initiators, such as peroxides, azo compounds, hydroperoxides or per-esters. So-called "regulators", such as mercaptans, may also be used. Auxiliaries, such as known dispersants, suspending agents or emulsifiers, are normally used in dispersion or suspension polymerization. If grafting is carried out in media, the graft copolymerization reaction should be carried out at a pH of from 12 to 2.

The polymerization processes may be carried out in batches, semi-continuously or continuously. The monomers (I), optionally in admixture with other monomers, are radically graft copolymerized in the presence of the elastomeric graft substrate, the monomers being at least partially grafted onto the elastomer. Grafting may be varied within wide ranges; the amount of grafting is determined by the grafting yield or degree of grafting. Accordingly, the graft polymers according to the present invention are understood to be products containing graft copolymers and homo- or co-polymers of the monomers to be grafted on.

After graft polymerization, the polymers may be worked-up by conventional methods, for example by filtration, coagulation and filtration, spray drying and evaporation processes. Working-up at a pH below 7 is particularly suitable. There is no need for working-up to be carried out within such limits if the grafting reaction itself was carried out at a pH below 7. If polymerization was carried out in alkaline medium, a pH below 7, preferably from 4 to 6 should be adjusted during working-up. Fillers, stabilizers, plasticizers, pigments, antioxidants, may be added to the graft polymers before further working-up, depending on the commercial application invisaged for the polymers.

The present invention also relates to thermoplastic polyamide moulding compositions containing the graft copolymers, according to the present invention.

The moulding compositions according to the present invention are distinguished, depending upon the modifier content thereof, by the fact that they retain toughness down to −40° C., so that a deterioration in toughness only occurs below that temperature. In addition, the modified polyamide moulding compositions are distinguished by very good flow behaviour in the melt.

The thermoplastic polyamide moulding compositions according to the present invention preferably consist of:
(A) from 65 to 97%, by weight, preferably from 70 to 95%, by weight, more preferably from 75 to 80%, by weight, based on components (A) and (B), of a polyamide; and
(B) from 3 to 35%, by weight, preferably from 5 to 30%, by weight, more preferably from 10 to 25%, by weight, based on component (A) and (B), of a particulate graft copolymer according to the present invention of the type described above.

Suitable polyamides (A) are thermoplastic polyamides, preferably partially crystalline polyamides. Thus, polyamide-6, polyamide-66 or copolyamides thereof may be used as partially crystalline polyamides for the moulding compositions according to the present invention. It is also possible to use partially crystalline polyamides of which the acid component consists completely or partially of terephthalic acid and/or isophthalic acid and/or suberic acid and/or cyclohexane dicarboxylic acid and of which the diamine component consists completely or partially of m- and/or p-xylylene diamine and/or hexamethylene diamine and/or 2,2,4-trimethylhexamethylene diamine and/or 2,4,4-trimethylhexamethylene diamine and/or isophorone diamine.

Other suitable polyamides are polyamides which have been partially produced from $C_6$–$C_{12}$ lactams using one or more the the above-mentioned starting components.

Particularly preferred partially crystalline polyamides are polyamide-6 and polyamide-66.

The thermoplastic polyamides should preferably have a relative viscosity (as measured using a 1%, by weight, solution in m-cresol at 25° C.) of from 2.0 to 5.0, preferably from 2.5 to 4.0.

The polyamide moulding compositions according to the present invention may contain conventional additives, such as lubricants and mould release agents, nucleating agents, stabilizers, fillers and reinforcing materials, flame-proofing agents and also dyes.

The filled or reinforced moulding compositions may contain up to 60%, by weight, based on reinforced moulding compositions, of fillers and/or reinforcing materials. Preferred reinforcing materials are glass fibres. Preferred fillers, which may also have a reinforcing effect, are glass beads, mica, silicates, feldspar, quartz, talcum, titanium dioxide, wollastonite.

Moulding compositions treated with flameproofing agents may contain these additives in an amount of generally less than 30%, by weight, based on the flame-proofed moulding compositions, and show adequate flame resistance.

Known flameproofing agents may be used, such as melamine and its salts, such as melamine cyanurate or melamine sulphate, or red phosphorus.

The moulding compositions may be produced in conventional mixing units, such as mixing rolls, kneaders, single-screw and multi-screw extruders.

Although in most cases all the components are preferably mixed in a single step, it may be advisable in some cases to mix the components one after the other.

Thus, the moulding compositions according to the present invention may be produced from the above-mentioned mixing units by melting and homogenizing components (A) and (B) together or by incorporating graft polymer (B) in a melt of polyamide (A).

The temperature prevailing during preparation of the mixtures should be at least 10° C. and preferably at most 80° C. above the melting point of the polyamide.

The moulding compositions according to the present invention are distinguished by extreme toughness and very good flow behaviour.

These properties above all make the moulding compositions according to the present invention suitable for the production of injection mouldings and extruded mouldings, above all in the automotive field for fenders and bodywork trim.

EXAMPLES

A. Components used/graft polymers according to the present invention

I. Polyamide-6 having a relative viscosity (as measured using a 1%, by weight, solution in m-cresol at 25° C.) of 3.0.

II. Polyamide-66 having a relative viscosity of 3.0 measured in the same way as for I.

III. Polyamide of isophthalic acid or hexamethylene diamine ($\eta_{rel}$ 2.68 measured in the same way as for I).

IV. Graft copolymers

IV.1 Graft substrates

IV.1.1 Polybutadiene having an average particle size of 0.4 μm ($d_{50}$-value) and a gel content of 87%, by weight, in the form of an aqueous emulsion having a polymer solids content of 49%, by weight.

IV.1.2 Polybutylacrylate having an average particle size of 0.45 μm ($d_{50}$-value) and a gel content of 87%, by weight, (the gel content was adjusted by copolymerization with triallyl cyanurate as cross-linking comonomer). The rubber is present in the form of an aqueous emulsion having a polymer solids content of 37%, by weight.

IV.1.3 An ethylene-vinylacetate copolymer having a vinylacetate content of 30%, by weight. The polymer is soluble in organic liquids and has no gel content. The polymer is present in the form of an aqueous emulsion; the emulsion has a solids content of 37%, by weight.

IV.2 Monomers for grafting

The following compounds are used as monomers:

| | |
|---|---|
| N—vinylmethylurethane | (A) |
| N—vinylacetamide | (B) |
| N—vinyl-N—methylacetamide | (C) |
| CH$_2$=C(CH$_3$)—COO—CH$_2$—CH$_2$—NH—COOCH$_3$ | (D) |

EXAMPLES 1 TO 10

2416 parts, by weight, of the rubber lates IV.1.1 and 850 parts, by weight, of water are introduced into a reactor. After heating to 65° C., polymerization is initiated by the addition of 3.4 parts, by weight, of potassium peroxidisulphate dissolved in 100 parts, by weight, of water.

Thereafter, the following product streams are uniformly introduced into the reactor over a period of 4 hours at 65° C.

| Monomers: | 300 parts, by weight |
|---|---|
| Emulsifier: | 410 parts, by weight, of water |
| | 22 parts, by weight, of the sodium salt of disproportionated abietic acid |
| | 22 parts, by weight, of IN sodium hydroxide |

TABLE 1

| | Graft polymers | |
|---|---|---|
| Examples | parts by weight | Monomer |
| IV.1 | 300 | methyl methacrylate (comparison) |
| IV.2 | 293 | methyl methacrylate |
| | 7 | A |
| IV.3 | 293 | methyl methacrylate |
| | 7 | B |
| IV.4 | 293 | methyl methacrylate |
| | 7 | C |
| IV.5 | 293 | methyl methacrylate |
| | 7 | D |
| IV.6 | 216 | styrene |
| | 84 | acrylonitrile (comparison) |
| IV.7 | 211 | styrene |
| | 82 | acrylonitrile |
| | 7 | A |
| IV.8 | 211 | styrene |
| | 82 | acrylonitrile |
| | 7 | D |
| IV.9 | 291 | methyl methacrylate |
| | 9 | A |
| IV.10 | 285 | methyl methacrylate |
| | 15 | A |

After the monomers indicated in Table 1 have been introduced, the emulsion is heated for 4 hours at 65° C. The emulsion is then stabilized with 1.6 parts, by weight, based on 100 parts, by weight, of graft polymer, of phenolic antioxidants. For working-up into powders, the emulsions are coagulated with a mixture of MgSO$_4$ and acetic acid at pH 4–5, washed and dried.

EXAMPLES 11 TO 13

5797 parts, by weight, of the rubber latex IV.1.2 and 1000 parts, by weight, of water are introduced into a reactor. After heating to 70° C., polymerization is initiated by the addition of 4 parts, by weight, of potassium peroxydisulphate dissolved in 240 parts, by weight, of water. Thereafter, the following product streams are uniformly introduced into the reactor over a period of 5 hours at 70° C.

| Monomer: | 920 parts, by weight |
|---|---|
| Emulsifier: | 792 parts, by weight, of water |
| | 14 parts, by weight, of the sodium salt of C$_{16}$-C$_{18}$ alkyl sulphonates |

TABLE 2

| | Graft-copolymers | |
|---|---|---|
| Examples | parts, by weight, | monomer |
| IV.11 | 920 | methyl methacrylate (comparison) |
| IV.12 | 901 | methyl methacrylate |
| | 19 | A |
| IV.13 | 893 | methyl methacrylate |
| | 27 | A |

After the monomers indicated in Table 2 have been added, the emulsion is heated for 4 hours at 70° C. The emulsion is then stabilized with 1 part, by weight, based on 100 parts, by weight, of graft polymer, of phenolic antioxidants. For working-up into powders, the emulsions are coagulated with MgSO4 at pH values of about 5, washed and dried.

EXAMPLES 14 TO 16

5799 parts, by weight, of the rubber latex IV.1.3 and 1000 parts, by weight, of water are introduced into a reactor. After heating to 80° C., polymerization is initiated by the addition of 4 parts, by weight, of azoisobutyronitrile and 1 g of lauroyl peroxide dissolved in 10 parts, by weight, of the monomer combinations according to Table 3. The following product stream is the uniformly introduced into the reactor over a period of 5 hours at from 70° to 80° C.:

| Monomer. | 920 parts, by weight |
| --- | --- |
|  | 4 parts, by weight, of azoisobutyronitrile |

TABLE 3

|  | Graft polymers |
| --- | --- |
| Examples | parts, by weight, monomer |
| IV.14 | 901 methyl methacrylate |
|  | 19 A |
| IV.15 | 901 methyl methacrylate |
|  | 19 C |
| IV.16 | 600 styrene |
|  | 280 acrylonitrile |
|  | 40 B |

After the addition, the emulsion is stirred for 6 hours at 80° C. Thereafter, the emulsion is coagulated at pH 7 with a mixture of NaCl and CaCl2, filtered, cleaned by washing with water and dried.

Unlike the comparison products, the graft polymers according to the present invention may be isolated particularly readily from aqueous emulsions. In addition, they show improved dehydration behaviour when dried and dehydrated by technical units. They may be used with particular advantage in admixture with thermoplasts, such as polyamides.

B. Production and testing of the polyamide moulding compositions

EXAMPLES 17 TO 30

The components were melted and homogenized in a continuous twin-screw extruder. The barrel temperatures were selected in such a way that the melt temperatures indicated in Table 4 were maintained. The melt strand was degassed before issuing from the die, cooled in water, granulated and dried.

ASTM bars were produced from the moulding compositions in an injection moulding machine and tested for Izod notched impact strength at various temperatures. The transition from brittle to tough was determined from the results obtained. The flow path was also determined.

TABLE 4

| Composition and properties of the moulding compositions | | | | | | |
| --- | --- | --- | --- | --- | --- | --- |
| | Components | | | IV graft product of | | Brittle-to-tough transition | Flow spiral |
| Examples | polyamides | % by weight | Example No. | %, by weight | (°C.) | (cm) |
| 18 (1) | I | 75 | IV.1 | 25 | −30 | 25 |
| 19 | I | 75 | IV.2 | 25 | −55 | 33 |
| 20 | I | 75 | IV.3 | 25 | −45 | 30 |
| 21 | I | 75 | IV.4 | 25 | −40 | 30 |
| 22 | I | 75 | IV.5 | 25 | −50 | 32 |
| 23 (1) | II | 70 | IV.1 | 30 | −20 | 35 |
| 24 | II | 70 | IV.5 | 30 | −35 | 38 |
| 25 (2) | III | 80 | IV.6 | 20 | −30 | 26 |
| 26 (2) | III | 80 | IV.7 | 20 | −40 | 28 |
| 27 (2) | III | 80 | IV.8 | 20 | −45 | 28 |
| 28 (1) | I | 80 | IV.11 | 20 | +10 | 35 |
| 29 | I | 80 | IV.12 | 20 | −15 | 38 |
| 30 | I | 80 | IV.13 | 20 | −15 | 38 |

(1) Comparison Example
(2) The melt temperature in the extruder and in the injection moulding machine was 245° C. The other melt temperatures were 280° C.

We claim:
1. A graft polymer which comprises:
(1) as substrate, an elastomer having a glass transition temperature below 0° C. and an average particle size of from 0.05 to 8 μm, determined by ultra-centrifuge; and
(2) as monomer, a compound corresponding to the following general formula (I):

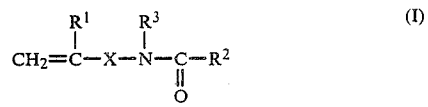

wherein
$R^1$ represents hydrogen or $C_1$–$C_4$-radical;
$R^2$ represents —$OR^4$;
$R^3$ represents hydrogen, a $C_{1-C8}$ alkyl or phenyl radical;
$R^4$ represents a $C_1$–$C_8$ alkyl or $C_6$–$C_{12}$ aryl radical, optionally substituted one or more times by alkyl or by O- or N-containing groups;
X represents a single bond, a $C_1$–$C_{10}$-alkylene a $C_6$–$C_{12}$ arylene radical or —C(O)—Y;
Y represents —O—Z— or —NH—Z—; and
Z represents a $C_1$–$C_{10}$ alkylene or $C_6$–$C_{12}$ arylene radical.

2. A polymer as claimed in claim 1 wherein (2) comprises at least one other olefinically-unsaturated monomer.

3. A polymer as claimed in claim 1 wherein it comprises from 8 to 85%, by weight, of (1) and from 92 to 15%, by weight, of (2).

4. A polymer as claimed in claim 3 wherein it comprises from 50 to 75%, by weight, of (1) and from 50 to 25%, by weight, of (2).

5. A polymer as claimed in claim 1 wherein (2) comprises from 0.1 to 100%, by weight, of monomer (I) and from 0 to 99.9%, by weight, of other olefinically-unsaturated monomer.

6. A polymer as claimed in claim 5 wherein (2) comprises from 0.5 to 20%, by weight, of monomer (I) and from 99.5 to 80%, by weight, of other olefinically-unsaturated monomer.

7. A polymer as claimed in claim 5, wherein the other olefinically unsaturated monomer is a monomer selected from the group consisting of vinyl monomers, vinylidene monomers, $\alpha,\beta$-unsaturated nitriles, alkyl acrylates containing up to 12 carbon atoms in the ester group, methacrylates containing up to 12 carbon atoms in the ester group, methacrylic acid, acrylic acid, acrylamide, methacrylamide, vinylacetate, vinylpropionate, $\alpha$-olefins, maleic acid, and maleic acid anhydride.

8. A polymer as claimed in claim 1, wherein the graft substrate is partially crosslinked and is a member selected from the group consisting of diene rubbers, olefin rubbers, silicone rubbers and acrylate rubbers.

9. A polymer as claimed in claim 1 wherein graft monomers (2) are N-vinylmethylurethane, N-vinylphenylurethane,

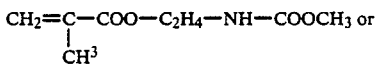

$$CH_2=\underset{\underset{CH^3}{|}}{C}-COO-C_2H_4-NH-COOCH_3 \text{ or}$$

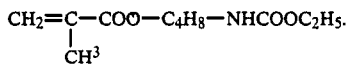

$$CH_2=\underset{\underset{CH^3}{|}}{C}-COO-C_4H_8-NHCOOC_2H_5.$$

10. A polymer as claimed in claim 1 wherein the substrate (1) is at least 50% cross-linked.

11. A polymer as claimed in claim 1 wherein the substrate particle size is from 0.08 to 1 $\mu$m.

12. A polymer as claimed in claim 1 wherein the substrate (1) is polybutadiene, polychloroprene, polyisoprene, ethylene/vinyl acetate copolymer, ethylene/acrylate copolymer or polymers containing alkyl acrylate moieties having up to 12 carbon atoms in the ester moiety.

13. A polymer as claimed in claim 1 wherein the substrate (1) is a homopolymer or copolymer of polybutadiene with a particle size of 0.09 $\mu$m to 0.6 $\mu$m and a gel content of greater than 50%, by weight.

14. A polymer as claimed in claim 1 wherein the substrate (1) is an alkyl acrylate rubber having a particle size of 0.06 $\mu$m to 0.9 $\mu$m and a gel content of greater than 20%, by weight.

15. A polymer as claimed in claim 14 wherein the substrate gel content is greater than 80%, by weight.

16. A polymer as claimed in claim 7 wherein said other olefinically unsaturated monomer is a vinyl monomer which is styrene, $\alpha$-methyl styrene, p-methyl styrene or halo-substituted styrene.

17. A polymer as claimed in claim 1 wherein graft monomers (2) are

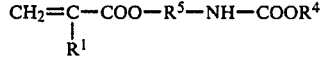

$$CH_2=\underset{\underset{R^1}{|}}{C}-COO-R^5-NH-COOR^4$$

wherein $R^1$ and $R^4$ are as defined above and $R^5$ is a $C_1-C_5$ alkylene.

18. A polymer as claimed in claim 2 wherein the substrate (1) is a polybutyl acrylate and the graft monomer (2) is a mixture of methyl methacrylate and N-vinyl-methyl urethane.

19. A polymer as claimed in claim 2 wherein the substrate (1) is an ethylene vinylacetate copolymer and the graft monomer (2) is a mixture of methyl methacrylate and N-vinyl-methyl urethane.

* * * * *